US011677251B2

(12) United States Patent
Brier

(10) Patent No.: US 11,677,251 B2
(45) Date of Patent: Jun. 13, 2023

(54) PORTABLE BATTERY PACK WITH SECURITY ANCHOR BASE

(71) Applicant: Jared Brier, Mill Valley, CA (US)

(72) Inventor: Jared Brier, Mill Valley, CA (US)

(*) Notice: Subject to any disclaimer, the term of this patent is extended or adjusted under 35 U.S.C. 154(b) by 250 days.

(21) Appl. No.: 17/127,981

(22) Filed: Dec. 18, 2020

(65) Prior Publication Data

US 2022/0200298 A1 Jun. 23, 2022

(51) Int. Cl.
*H01M 10/44* (2006.01)
*H01M 10/46* (2006.01)
*H02J 7/00* (2006.01)
*G08B 25/10* (2006.01)

(52) U.S. Cl.
CPC ............ *H02J 7/0044* (2013.01); *G08B 25/10* (2013.01); *H02J 7/0014* (2013.01)

(58) Field of Classification Search
CPC ...... H02J 7/0044; H02J 7/0042; H02J 7/0014; G08B 25/10; G08B 113/1436; G08B 13/1445
USPC .......................... 320/107, 112, 114, 115, 149
See application file for complete search history.

(56) References Cited

U.S. PATENT DOCUMENTS

| 5,408,212 | A | 4/1995 | Meyers et al. |
| 7,837,162 | B2 | 11/2010 | Adams |
| 8,659,425 | B2 | 2/2014 | Kersch et al. |
| 9,607,493 | B2 | 3/2017 | McClain et al. |
| 2010/0228405 | A1* | 9/2010 | Morgal ................... B60L 50/20 701/1 |
| 2011/0187072 | A1 | 8/2011 | Park |
| 2014/0000322 | A1 | 1/2014 | Williams |
| 2015/0020558 | A1 | 1/2015 | Williams |
| 2015/0364875 | A1 | 12/2015 | Ginsberg |

(Continued)

FOREIGN PATENT DOCUMENTS

KR 10-2018-0067239 6/2018
WO WO-2017031313 A1 * 2/2017 ............ G08B 25/10

OTHER PUBLICATIONS

Nces.ed.gov [online], "Back to School Statistics," available on or before Dec. 1, 2015, via Internet Archive: Wayback Machine URL <http://web.archive.org/web/20151201083425/http://nces.ed.gov/fastfacts/display.asp?id=372>, [Retrieved on Jun. 8, 2022], URL<https://nces.ed.gov/fastfacts/display.asp?id=372>, 2 pages.

(Continued)

*Primary Examiner* — Edward Tso
(74) *Attorney, Agent, or Firm* — Fish & Richardson P.C.

(57) ABSTRACT

Embodiments are disclosed for a portable battery pack with a secure anchor base. In an embodiment, an apparatus comprises: a housing having a top surface and at least one side surface, the housing having two or more ports, the two or more output ports including at least one charging port configured to charge an accessory device attached to the at least one charging port and a cable input port for receiving a cable pin; one or more batteries; one or more printed circuit boards containing electronic components, wherein the electronic components include charging circuitry coupled to the charging port and the one or more batteries; an anchor base assembly, including: an actuator; mechanical linkage coupled to the actuator; and a lock configured to lock or unlock the actuator.

17 Claims, 13 Drawing Sheets

(56) References Cited

U.S. PATENT DOCUMENTS

2019/0248439 A1    8/2019  Wang

OTHER PUBLICATIONS

PCT International Search Report and Written Opinion in International Appln. No. PCT/US2021/064211, dated Apr. 12, 2022, 9 pages.
Schoolguides.com [online], "Survey reveals how much college students rely on technology," available on or before Nov. 8, 2015, via Internet Archive: Wayback Machine URL<http://web.archive.org/web/20151108071409/https://www.schoolguides.com/College_News/survey_reveals_how_much_college_students_rely_on_technology_643742.html>, [Retrieved on Jun. 8, 2022], URL<https://www.schoolguides.com/College_News/survey_reveals_how_much_college_students_rely_on_technology_643742.html>, 2 pages.
Virgin.com [online], "In focus: The rise of flexible working," available on or before Nov. 26, 2015, via Internet Archive: Wayback Machine URL <http://web.archive.org/web/20151126231349/http://www.virgin.com/entrepreneur/in-focus-the-rise-of-flexible-working>, [Retrieved on Jun. 8, 2022], URL<http://www.virgin.com/entrepreneur/in-focus-the-rise-of-flexible-working>, 32 pages.

* cited by examiner

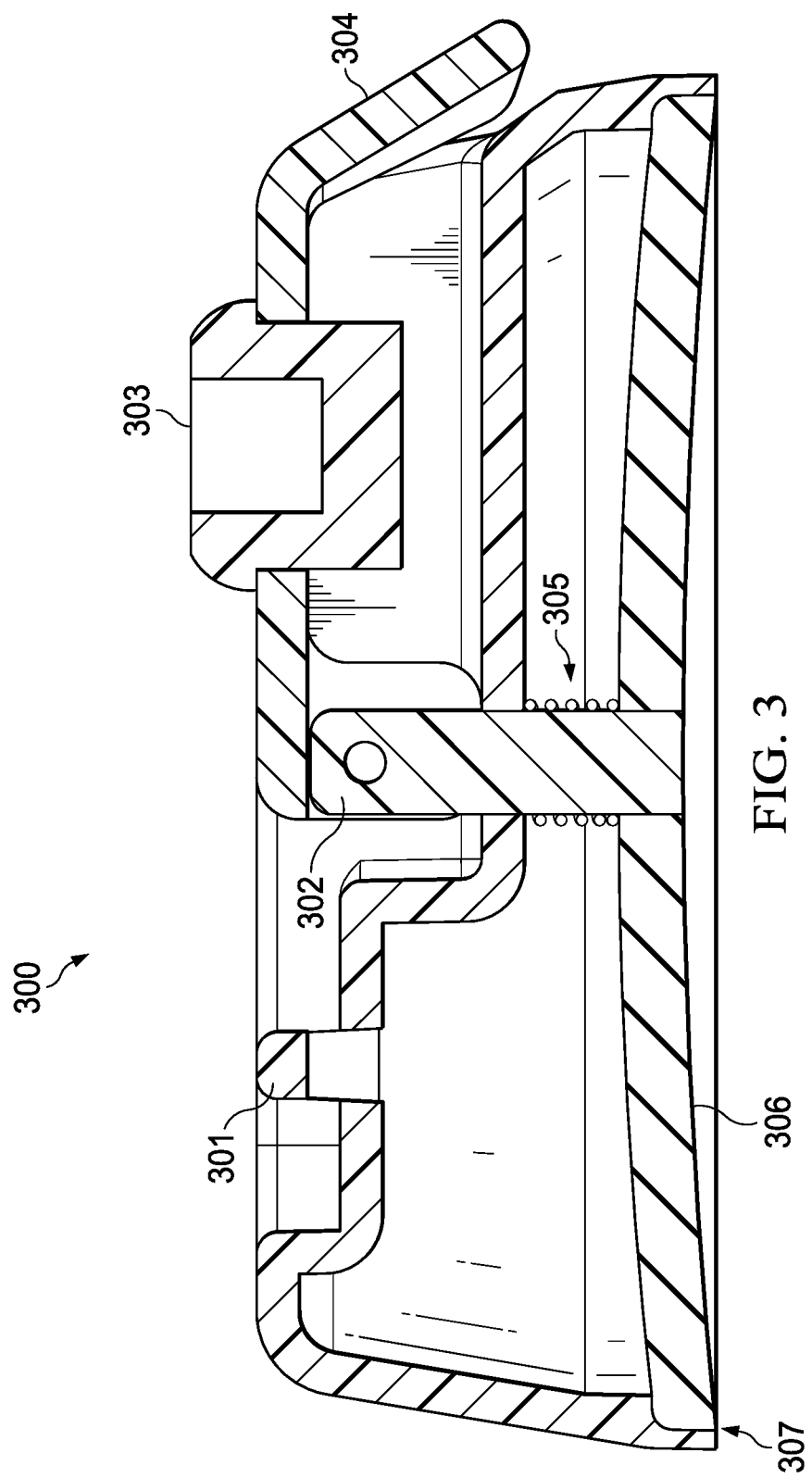

PORTABLE BATTERY PACK WITH SECURITY ANCHOR BASE

TECHNICAL FIELD

This disclosure relates generally to battery packs and anti-theft devices for portable electronic devices.

BACKGROUND

Portable computers are now ubiquitous throughout the world. Two common problems associated with portable computers are power and theft. Because portable computers are battery-powered, users must plan for recharging their portable computer when they travel. Although many airports and other public facilities now have charging stations or kiosks with power outlets for charging portable devices, there are still many instances where no power outlets are available. For example, there is often no power outlets available on public transportation, such as airplanes, buses and trains, or at public gathering areas, such as shopping malls, libraries, museums, entertainment venues, etc. For situations where power outlets are not available, users often rely on portable battery packs to provide power for their portable devices.

A portable battery pack typically includes a number of rechargeable battery cells configured in series, parallel or both to deliver a desired voltage, capacity, or power density. Some battery packs may also include a voltage regulator to keep the voltage of each individual cell below its maximum value during charging so as to allow weaker batteries to become fully charged. Some battery packs may include a battery balancer that transfers energy from strong cells to weaker cells to improve load balancing.

An advantage of a battery pack is the ease with which it can be swapped into or out of a device. This allows multiple packs to deliver extended runtimes, freeing up the device for continued use while charging the removed pack separately. A disadvantage is that the user must now carry an additional accessory when they travel, which can be inconvenient when the user is already carrying a smartphone, tablet computer, headset, portable speaker, and the various chords and connects typically used with accessories.

The other issue with portable computers is theft. The theft of "laptop" computers is a significant threat to users. Victims of laptop theft can lose hardware, software, and essential or sensitive data that has not been backed up.

Many methods to protect data and to prevent theft have been developed, including alarms, laptop locks, and visual deterrents such as stickers or labels. For example, a security T-slot found on some portable computers can be used to attach a cable with a combination lock, so that the portable computer can be mechanically locked to an object or infrastructure. However, finding a suitable object or infrastructure can be challenging, and can significantly reduce the "portability" of the computer, as the user must choose a location where there is suitable infrastructure for attaching the lock. One solution when there is no suitable infrastructure available is to use an anchor base that attaches to a surface, such as a table, using adhesive or suction cup. The anchor base has a ring or other structure that can receive a cut resistant cable to secure the laptop to the surface with a combination lock. A disadvantage of using such an anchor base is that it is yet another accessory that the user must carry with them when they travel.

SUMMARY

Embodiments are disclosed for a portable battery pack with a secure anchor base. In an embodiment, an apparatus comprises: a housing having a top surface and at least one side surface, the housing having two or more ports, the two or more output ports including at least one charging port configured to charge an accessory device attached to the at least one charging port and a cable input port for receiving a cable pin; one or more batteries; one or more printed circuit boards containing electronic components, wherein the electronic components include charging circuitry coupled to the charging port and the one or more batteries; an anchor base assembly, including: an actuator; mechanical linkage coupled to the actuator; and a lock configured to lock or unlock the actuator.

In an embodiment, a method comprises: receiving, using one or more processors of a portable battery pack device, a signal that a security anchor base of the portable battery pack device is attached to a contact surface and locked; responsive to the signal, placing the portable battery pack into an alarmed state; determining, using or more motion sensors of the portable battery pack device, that the portable battery pack is in motion; responsive to determining that the portable battery pack device is in motion, triggering an audible alarm that is played through a loudspeaker of the portable battery pack device.

Particular embodiments disclosed herein provide one or more of the following advantages. A portable battery pack with security anchor base provides utility functions to users as well as means for securing a user's personal belongings (e.g., a laptop) to a surface or object (e.g., a bicycle). The components of the device are included in the same housing so that the user does not have to carry multiple accessories. In addition to providing power and a secure anchor base, the system includers multiple accessory ports of different types, allowing the system to operate as a "hub" for accessories, such as Universal Serial Bus (USB), Thunderbolt, Ethernet, FireWire, Bluetooth, SCSI, HDMI, headphones port, DVI and MIDI. In an embodiment, the security lock and cable system uses a suction cup coupled to a mechanical actuator (e.g., a lever) to affix the device to a surface. In an embodiment, a cable (e.g., a retractable) cable) is included with the device. In an embodiment, a structure is provided for receiving a separate security cable, such as a t-slot style laptop security lock and cable.

The details of the disclosed embodiments are set forth in the accompanying drawings and the description below. Other features, objects and advantages are apparent from the description, drawings and claims.

DESCRIPTION OF DRAWINGS

FIG. 3 is a side, cut away view of the portable battery pack device showing a security anchor base assembly, according to an embodiment.

The same reference symbol used in various drawings indicates like elements.

INTERPRETATION OF TERMS/FIGURES

Figure 1A:
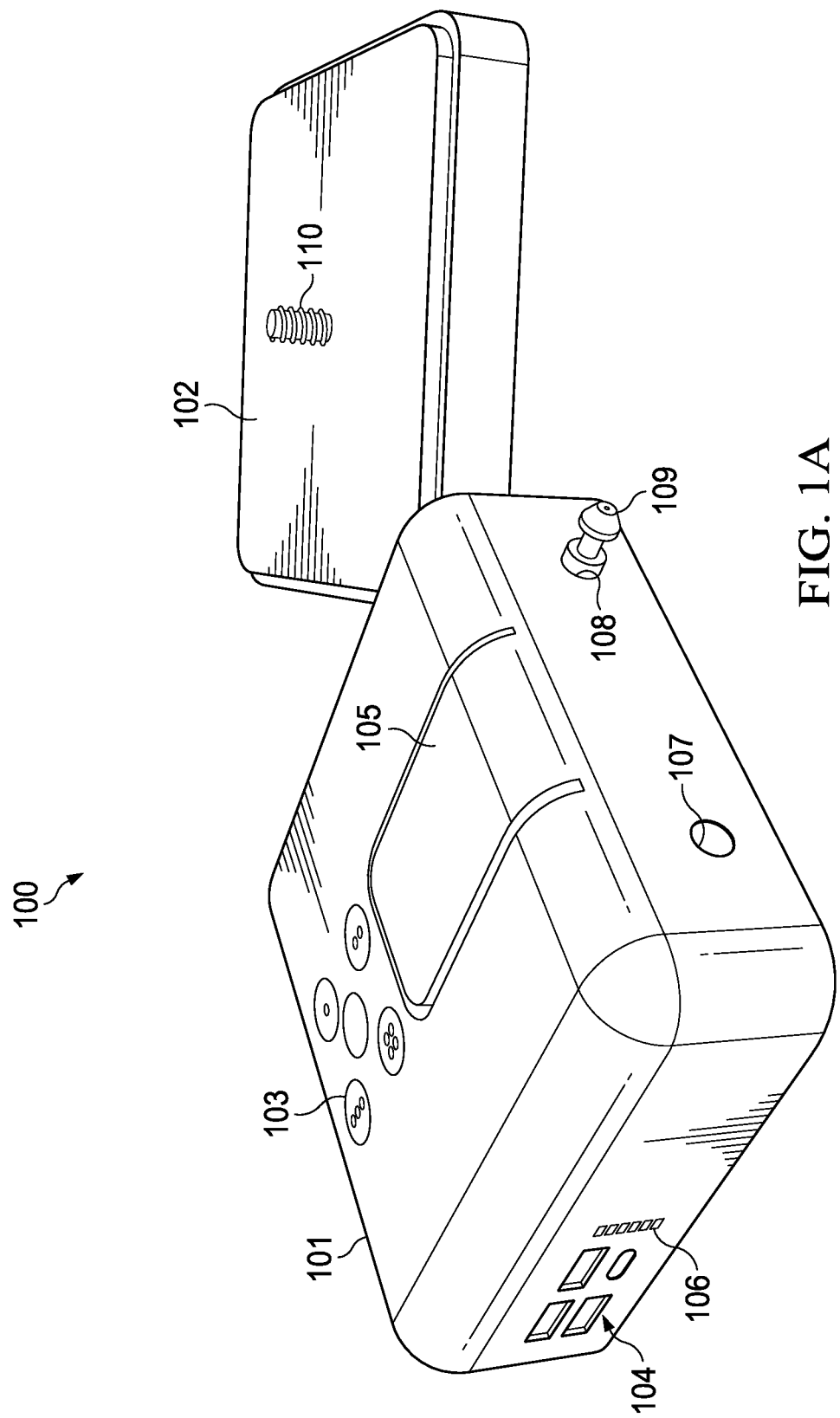
FIG. 1A is a perspective view of a portable battery pack device with security anchor base and accessory ports showing a housing and suction cup assembly unmated, according to an embodiment.

In the following detailed description, for the purposes of explanation, numerous specific details are set forth in order to provide a thorough understanding of the disclosed embodiments. It will be apparent, however, that the disclosed embodiments may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description.

As used herein the term "one or more" includes a function being performed by one element, a function being performed by more than one element, e.g., in a distributed fashion, several functions being performed by one element, several functions being performed by several elements, or any combination of the above. It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact. The terminology used in the description of the various described embodiments herein is for the purpose of describing particular embodiments only and is not intended to be limiting.

As used in the description of the various disclosed embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "includes," and/or "including," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Reference will now be made in detail to the disclosed embodiments, examples of which are illustrated in the accompanying drawings. In the following detailed description, numerous specific details are set forth to provide a thorough understanding of the various described embodiments. However, it will be apparent to one of ordinary skill in the art that the various disclosed embodiments may be practiced without these specific details. In other instances, well-known methods, procedures, components, circuits, and networks have not been described in detail so as not to unnecessarily obscure aspects of the disclosed embodiments.

DETAILED DESCRIPTION

In an embodiment, a portable battery pack device with security anchor base and accessory ports (hereinafter also referred to as "battery pack device") houses components working together to provide utility functions as well as providing security to users. The housing can be any desired shape or size (e.g., square, circular). At the base of the battery pack device is a security anchor base assembly including a rubber or plastic suction cup, metal plate with rod affixed and a spring. The suction cup is utilized to affix the device to a flat surface such as a table, wall, window and to provide a seal to create a strong hold of the device to the surface. The suction cup is switched between a locked/sealed position and an opened/released position by means of an actuator (e.g., a lever) attached to mechanical linkage (e.g., a rod and compression spring) by a pin on the actuator that is moved by the user pushing or pulling the actuator causing the suction cup to raise or lower. When the suction cup is raised after being pressed to a flat contact surface, a vacuum seal is created holding the battery pack device in place. When the actuator is in its down position the actuator is flush with the top surface of the housing. In the down position, the actuator can then be locked in its down position using a key lock or electronic lock as described in further detail below. The actuator can be any size or shape provided it can be easily manipulated by the user to raise and lower the suction cup. The suction cup can be single suction cup of suitable size and material or multiple suction cups of suitable size and material, provided the suction is strong enough to prevent the device from being pried away from its contact surface by human hands.

In an alternative embodiment, the suction cup is moved up and down by means of a twisting motion and threads on the rod, such that when the user turns the actuator (e.g., a lever/control), the rod raises and lowers, switching the suction cup between a locked/sealed position and an open/released position. In another alternative embodiment, the actuator is a button and when the user "pushes" down on the button the suction cup affixes to surface. In yet another embodiment, the suction cup is an electric vacuum suction cup or a pneumatic vacuum cup powered by an internal battery.

In its locked/sealed position, the bottom perimeter edge of the housing cover is flush with the contact surface to prevent easy prying of the device away from the contact surface. In an embodiment, a compressible rubber or plastic material is coated or attached to the bottom perimeter edge of the device so as to provide a thin cushion between the device and the surface to prevent damage to the surface. The rubber/plastic material also provides friction if the device is moved laterally while in the locked/sealed position on the surface.

In an embodiment, a mechanical key lock assembly or electronic lock are integrated into the device to keep the actuator from being raised from its locked/sealed position to its opened/released position. In the case of an electronic lock, a touch keypad is provided that allows the user to enter a 4-digit passcode to unlock the lever. In an embodiment, a fingerprint sensor is used in place or in addition to the touch keypad. In still other embodiments, Bluetooth, WiFi, near-field communication (NFC), radio frequency identification (RFID), digital keys from a fob or a cell phone or other electronic device can be used to unlock the lever.

Above the security anchor base assembly there is space to include one or more printed circuit boards with electronic components which can be included or excluded from the production of the device so as to provide a multitude of product variations with different features/enhancements. Such components include but a are not limited to various types of accessory ports for delivering data or power to accessories, one or more motion sensors (e.g., accelerometers), a Bluetooth transceiver, a WiFi transceiver for Internet connectivity, a Global Navigation Satellite System (GNSS) receiver, a media player and loudspeaker for playing music and audible alarms, a headset port for attaching a headset or earbuds, a mobile "hotspot" for travelling or camping. In an embodiment, a subscriber identification module (SIM) card can be inserted to share mobile data via, for example, WiFi. In an embodiment with Internet connectivity, the device functions as a "smart speaker" and includes a voice-activated digital assistant.

In an embodiment, the device includes a security cable assembly providing a retractable or non-retractable cable. The cable can be a cut-resistant steel cable that can be pulled from a cable output port of the housing, attached to a personal belonging, and then the pin of the cable is inserted into a cable input port of the housing where a locking mechanism locks the cable pin in place when the actuator is in its locked/sealed position. In another embodiment, the device includes a cable input port for receiving a t-slot type security cable or other security cable type.

In an embodiment, above the anchor base assembly is a printed circuit board which incorporates a motion sensor module, an alarm module, a light emitting diode (LED) indicator module, a Bluetooth transceiver module and a coin battery. In an embodiment, power is supplied to the components by the coin battery. In an alternative embodiment, the device is also powered by one or more rechargeable battery cells and includes battery recharging circuitry for recharging the battery cells from a power outlet or inductively from a charge mat.

In an embodiment, the device is "armed" once the actuator is placed in its locked/sealed position. A conductive path (e.g., a wire) is coupled to the lock, such that when the lever is engaged in its locked/sealed position, an electrical circuit is completed sending a signal to a processor on the printed circuit board that places the device in "armed" status, whereby the motion sensor module becomes active and sends a signal to the alarm module and LED indicator module if movement is detected. In an embodiment, the motion sensor module includes an accelerometer that detects acceleration. However, any suitable motion sensor can be used in addition to or instead of an accelerometer.

In an embodiment, the alarm module is configured to emit an audible alarm through a loudspeaker coupled to the device housing. In an embodiment, the audible alarm is set to varying levels by the user to provide a deterrent to a person who is trying to forcefully remove the device from its location and anything attached to the device, such as the user's personal belongings.

In an embodiment, the processor sends a signal to the LED indicator module causing the LEDs to flash in any desired configuration, color or pattern to indicate that the device has been compromised. For example, the LED indicator module is configured to flash and/or display a first color (e.g., green) to indicate that the device is "armed" so as to provide a deterrent to a person looking to compromise the device and move any object it is attached to against the will of the user. The LED flashes and/or displays second color (e.g., red) when the alarm is triggered by the motion sensor module.

In an embodiment, when the device is "armed" and the motion sensor module detects that the device is being moved, the processor causes a wireless transceiver (e.g., the Bluetooth module) to transmit a wireless signal that can be received by a paired (e.g., Bluetooth-enabled) remote device, such as a laptop, smart phone, smart watch or computer tablet, or any other user device, to notify the user that the battery pack device has been moved while the device was in "armed" mode. Additionally, the user can adjust settings such as the sensitivity of the motion sensor, including the duration of movement the motion sensor must detect before triggering an "alarm" signal, and to switch the motion sensor module on and off. The settings can be made using mechanical switches, the keypad, a remote device, an application running on a paired remote device or through a WiFi connection.

When paired with a remote device, a user may also configure additional tracking features such as a geofence that triggers the device alarm if the user's remote device (e.g., a smartphone, smartwatch) moves a certain radial distance away from the device (crosses the geofence) and vice versa (as determined using the GNSS receiver or WiFi/Bluetooth location technology), or initiates certain processes or functions after connecting to the remote device or moving a certain distance to/from the remote device, such as sending a text message, notification, email or phone call to the remote device.

In an embodiment, the PCB or a second PCB includes a battery cell array. The battery cell array is coupled to an input charging port for recharging the battery cells and multiple accessory ports providing power and/or data to multiple other devices. In an embodiment, the accessory ports include one or more of USB type A, USB type C, and Micro USB ports. In an embodiment, the battery cell array uses quick charge technologies and detects the maximum capable flow of current an accessory device can handle, and then delivers this optimal flow of current to charge the accessory device as efficiently as possible both in terms of speed and safety. The accessory port cuts off the flow of current once the accessory device reaches its full charge. In an embodiment, the battery pack device includes a temperature monitoring circuit that can gauge the temperature of the accessory device so as to prevent the accessory device from overheating.

The battery cell array and the accessory ports of the battery pack device work together to allow the battery cell array to charge efficiently, quickly, and safely. The battery cell array and accessory ports can also support pass through charging, whereby an electrical current can flow into the battery pack device and then pass through to charge accessory devices attached to the accessory ports. Once the accessory devices are charged, the battery pack device prioritizes the charging of its own battery cell array. In this manner, the battery pack device functions as a power hub with multiple accessory ports for charging several accessory devices at once.

In an embodiment, a conductive path (e.g., a wire) runs from the battery cell array to the processor on the PCB. The processor causes the Bluetooth/WiFi transceiver to transmit a data signal with the charge level of the battery cell array to a remote device (e.g., smart phone, smart watch, tablet computer). The charge level of the battery cell array can also be indicated by varying colors/patterns displayed by the LED indicator module and/or by audible alarms generated through the loudspeaker by the alarm module. For example, an audible alarm can be a loud beep or series of beeps when the charge of the battery cell array falls below X % (e.g., 10%).

The foregoing and other features will now be described in further detail with respect to the figures.

System Overview

Figure 2A:
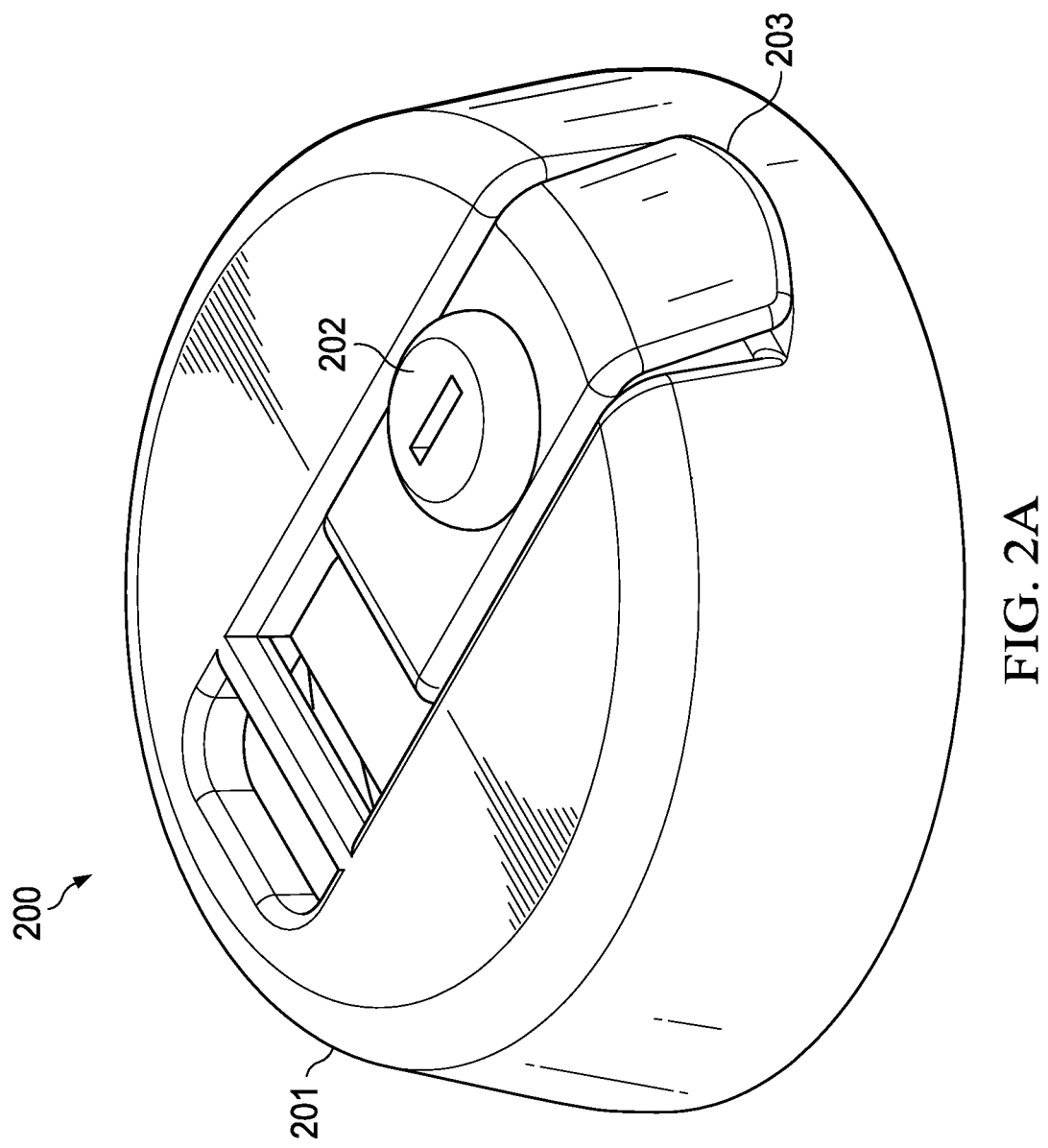
FIG. 2A is a perspective view of an alternative design of the portable battery pack device with security anchor base and accessory ports, according to an embodiment.
Figure 2B:
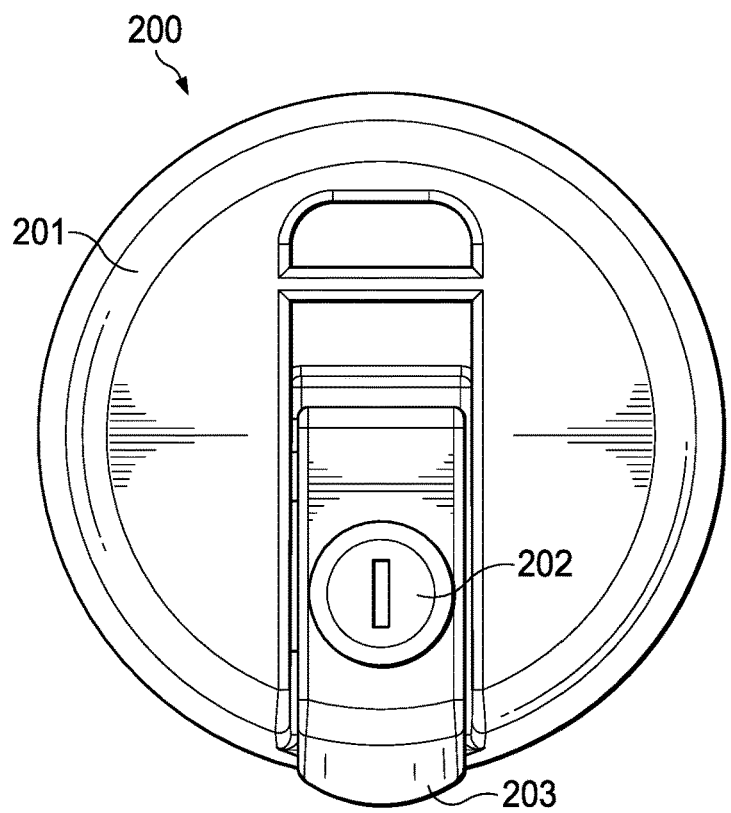
FIG. 2B is a top plan view of the portable battery pack device with security anchor base and accessory ports shown in FIG. 2A, according to an embodiment.
Figure 2C:
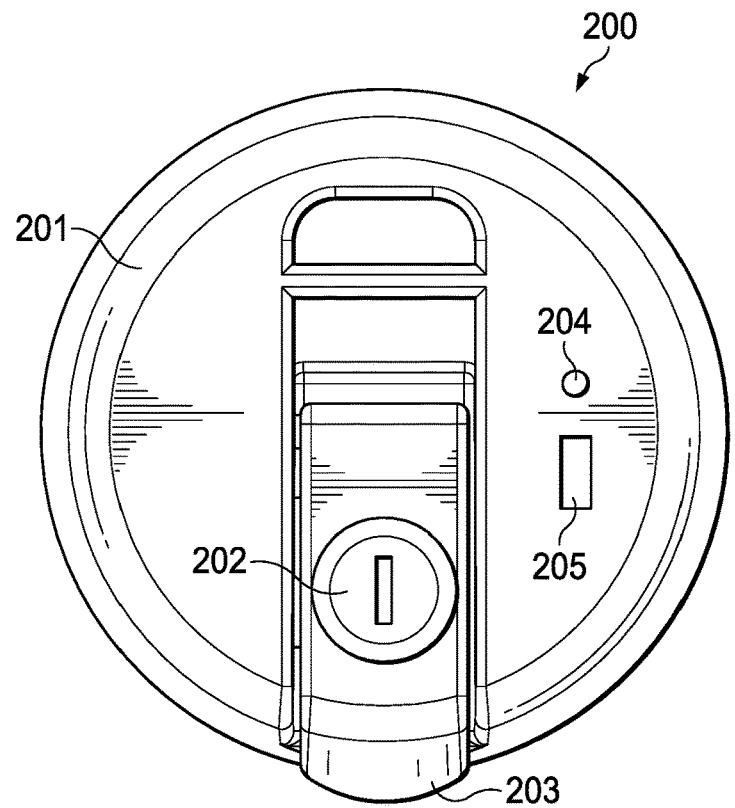
FIG. 2C is a top plan view of the portable battery pack device with security anchor base and accessory ports shown in FIG. 2B with a light emitting diode (LED) and charging port, according to an embodiment.

FIG. 1A is a perspective view of a portable battery pack device 100 with security anchor base and accessory ports (hereinafter "battery pack device"), according to an embodiment. Device 100 includes housing 101 and security anchor base assembly 102. Housing 101 includes keyless smart lock 103, accessory ports 104, actuator 105 (e.g., a lever), LEDs 106, cable input port 107 (cable not shown), cable output port 108 and cable pin 109. In the example shown, housing 101 is rounded-edge square brick. Housing 101, however, can be any shape, including rectangular and circular. An example of a circular-shaped housing is shown in FIGS. 2A-2C. Also, battery pack device 100 can be any desired dimensions.

Figure 1B:
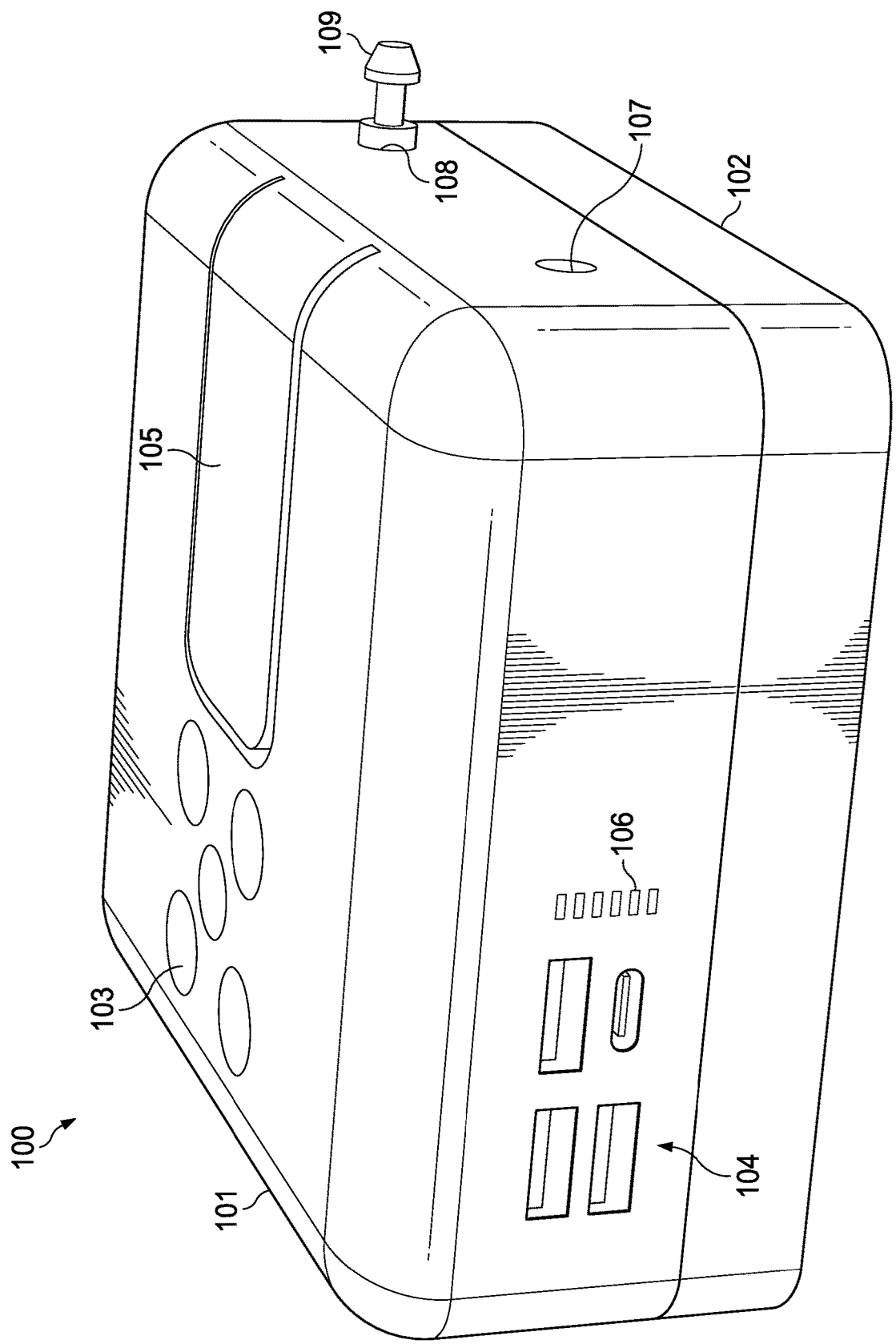
FIG. 1B is a perspective view of the portable battery pack device with security anchor base and accessory ports showing the housing and suction cup assembly in mated configuration, according to an embodiment.

The embodiment shown includes a retractable cable (only cable pin 109 is shown), such as a cut-resistant steel cable. The cable pin 109 is received by cable input port 107 where it is locked by a cable locking mechanism that engages when actuator 105 (e.g., a lever) is in the locked/sealed position. In an alternative embodiment, device 100 can also include a ring or other structure that the user can feed a separate security cable through and attach to a combination/key lock, such as laptop security cable that connects to t-bar slot built into a laptop computer. FIG. 1B is a perspective view of housing 101 in mated configuration with security anchor base assembly 102, according to an embodiment.

FIG. 2A is a perspective view of an alternative design of battery pack device 200, according to an embodiment. Device 200 includes circular shaped housing 201. Actuator 203 (e.g., a lever) is shown in the locked/sealed position. Mechanical key lock 202 is used to lock lever 203 in the locked/sealed position and also lock cable pin 109 in housing 201. FIG. 2B is a top plan view of battery pack device 200. FIG. 2C is a top plan view of battery pack device 200 including LED 204 and USB accessory port 205, according to an embodiment.

FIG. 3 is a side, cut away view of battery pack device 300 showing a security anchor base assembly, according to an embodiment. The anchor base assembly includes mounting point 301, pin 302, lock port 303, actuator 304, mechanical linkage 305, suction cup 306 and backing plate 307. In the embodiment shown, mechanical linkage 305 includes a rod and compression spring. Backing plate 307 can be made of metal, plastic or any suitable rigid material that can be coupled to suction cup 306.

Actuator 304 is rotatably coupled to pin 302 and mechanical linkage 305. When a user pushes actuator 304 (e.g., a lever) into its locked/sealed position (as shown), actuator 304 rotates about pin 302, causing the rod to move downward. The rod is attached to suction cup 306 via a backing plate 307 (See FIGS. 6B and 6C). The rod moves perpendicular to the top surface of the housing cover, thereby compressing the spring and forcing suction cup 305 to adhere to the contact surface. The user can then lock actuator 304 in place using mechanical lock port 303. When actuator 304 is in its locked/sealed position, housing edge 307 becomes flush with the contact surface making it difficult to pry away battery pack device 300 from the contact surface. When actuator 304 is unlocked it moves to its raised position due to the restoring force of the compressed spring, causing the attached rod to move upward, raising suction cup 305 from the contact surface and thus breaking the suction.

In an embodiment, a compressible material (e.g., rubber, plastic) is applied to the housing edge to create a tight fit to the contact surface and to provide friction that resists lateral movement of battery pack device 300. A space is shown for enhancements, such as one or more printed circuit boards and their respective components previously described. In an embodiment, a retractable cable assembly is included in the security anchor base assembly or the housing cover, which includes a cut-resistant steel cable that wraps around a cable spool. The cable spool contains a steel torsional spring which provides the force to retract the cable. A ratcheting mechanism allows the spool on which the cable is wrapped to lock in different rotational configurations. The ratcheting mechanism includes a spring-loaded pawl and gear. The gear is fabricated with teeth covering approximately two thirds of the circumference. The remaining one third of the circumference has no teeth and a small radius; this results in the pawl slipping on the teeth in only one direction, but when it is in the toothless region it has the ability to switch directions, i.e. allowing the cable to retract freely into the housing cover or security anchor base assembly. In an embodiment, a conductive path (e.g., one or more wires) is embedded in the cable, such that if the cable is cut an electric current flow in the wire provided by a battery is disrupted. In an embodiment, the disruption in current flow is detected by comparing the voltage drop across a sense resistor to a reference voltage (e.g., the battery voltage).

In an embodiment, mounting point 301 provides an access point where a leash or cable can be threaded/guided through to secure the leash or cable to the battery pack device 300 then to another object. Additionally, accessory enhancements to battery pack device 300 may be attached to mounting point 301 or another mounting point.

Example Electronics Layout

Figure 4A:
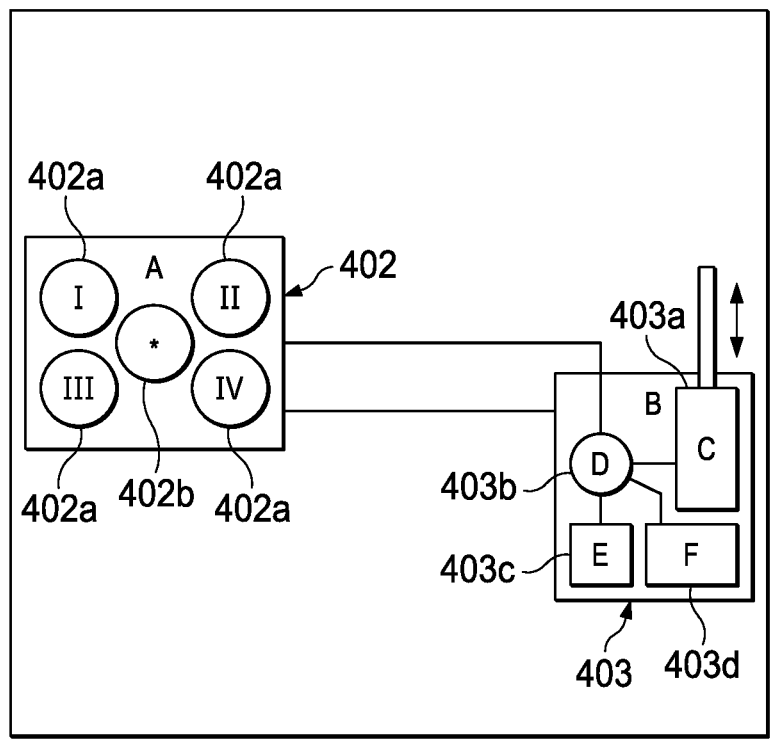
FIG. 4A is a top plan view of a first electronics component layer for the portable battery pack device, according to an embodiment.

FIG. 4A is a top plan view of a first electronics component layer for the portable battery pack device, according to an embodiment. The first electronics component layer includes digital keypad PCB 402 with combo buttons 402a and lock button/LED 402b. Motorlock PCB 403 includes motorlock and bolt 403a, coin battery 403b (e.g., Li-ion battery) for powering components on the PCBs, vibration sensor 403c and alarm module 403d (e.g., 100 db+). In an embodiment, when lock button/LED 402e is pressed by the user, the bolt of motorlock 403a extends and a loudspeaker of alarm module 403e beeps. If the correct code is input by the user using combo buttons 402a, the bolt retracts and alarm module 403e initiates a beep through the loudspeaker.

Vibration sensor 403c is activated when the battery pack device is moved. If vibration sensor 403c is activated, a processor (not shown) causes alarm module 403d to emit an audible sound (e.g., a siren) through the loudspeaker and button/LED 402b flashes red to indicate the battery pack device has been potentially tampered with. In an embodiment, the sensitivity of vibration sensor 403c is set to activate only when the vibrations exceed a threshold to avoid the alarm from triggering due to vibrational noise originating from the contact surface. For example, vibration sensor 403c can include an accelerometer and the acceleration threshold for triggering an alarm can be set such that only an acceleration of a specified magnitude and/or duration and/or in a particular direction triggers an alarm.

Figure 4B:
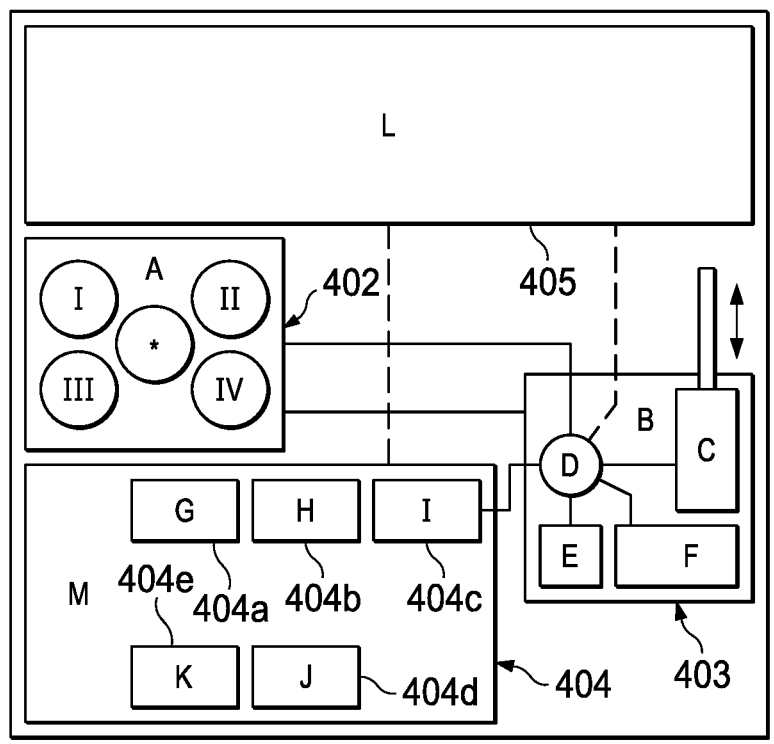
FIG. 4B is a top plan view of a second electronics component layer for the portable battery pack device, according to an embodiment.

FIG. 4B is a top plan view of a second electronics component layer for the portable battery pack device, according to an embodiment. The second electronics component layer includes PCB 404 that includes WiFi chip 404a, global positioning system (GPS) receiver chip 404b, Bluetooth low energy beacon (BLE) chip 404c, radio frequency integrated circuit (RFIC) 404d, micro SD slot 404e. Also included is rechargeable battery 405 (e.g., Li-ion, 10 k mAH+). Rechargeable battery 405 powers the components on PCBs 402, 403 and 405 and also keeps coin battery 403b charged.

Alarm states generated by alarm module 403d are sent as signals to PCB 404. The alarm state can be decoded from the signal and encoded for transmission to a remote device using one or more of Wi-Fi chip 404a, BLE chip 404c and/or RFIC transceiver 404d. Wireless communications can include but are not limited to: changing the sensitivity for vibration sensing, set the volume of an audible alarm, charge level data for battery 405. To ensure that the anchor base security functions are not disabled, there is no control access to alarm module 403d or vibration sensor 403c through wireless communications.

In an embodiment, a cellular signal is broadcast by WiFi chip 404a to convert the battery pack device into a mobile "hot spot." Also, WiFi can be used as a repeater to provide a boosted WiFi signal, or configure itself as a router for private and secure communications using a virtual private network (VPN) or other controls. In an embodiment, WiFi chip 404a and RFIC transceiver 404d allow read/write of data on a micro SD inserted in micro SD slot 404e so that the battery pack device can double as a remote/local media server.

Figure 4C:
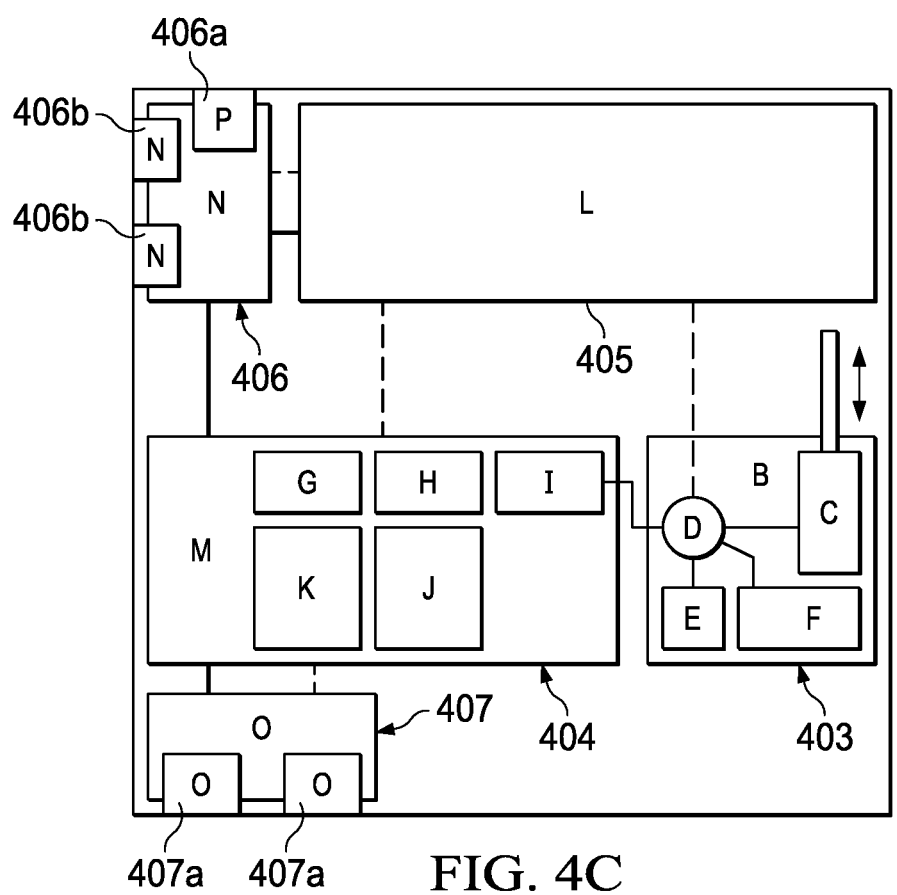
FIG. 4C is a top plan view of a third electronics component layer for the portable battery pack device, according to an embodiment.

FIG. 4C is a top plan view of a third electronics component layer for the portable battery pack device, according to an embodiment. Additional PCB 406 includes one or more USB-A 3.0 ports 406a for Quickcharge and data transmission. PCB 408 also includes one or more USB-C ports 406b for Quickcharge and data transfer. PCB 408 also includes other ports for data transfer, including but not limited to: micro USB, Thunderbolt, Ethernet, FireWire, Bluetooth, SCSI, HDMI, headphones port, DVI and MIDI.

The USB-A and USB-C ports draw power from rechargeable battery 405 to charge accessory devices when the battery pack devices is not plugged into a wall outlet. If the power source delivering power through USB-C port is greater than that of the output of battery pack 406, or if battery pack 405 is depleted, the pass through charging is initiated where power input to the USB-C port charges accessory devices plugged into any/all of the USB-A and USB C ports. In an application, mobile application is used to control charging priorities and manual control of x % of power flow to each accessory port.

In an embodiment, the USB-A and USB-C ports relay data signals. For example, USB-C port connects to a computer and becomes a hub with input/outputs USB-A and USB-C ports. In an embodiment, the USB-A and USB-C ports all become input/output (I/O) ports to transfer data to/from a micro SD installed in micro SD slot 404e. In an embodiment, mobile data stored on a subscriber interface module (SIM) card can be shared with other devices using the USB-A and USB-C ports.

Figure 5A:
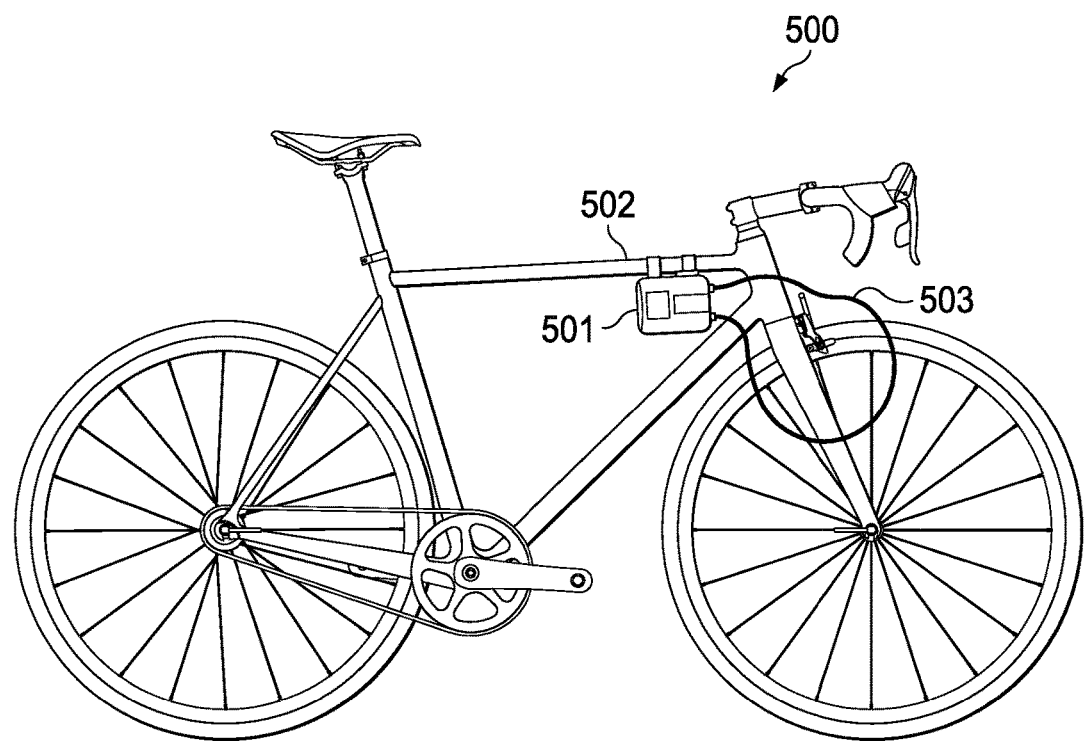
FIG. 5A illustrates a bicycle accessory that is used to mount the portable battery pack device to a bicycle, according to an embodiment.

FIG. 5A illustrates the battery pack device mounted to the frame of a bicycle using a battery pack holder, according to an embodiment. Battery pack holder 501 is installed on frame 502 of bicycle 500 using brackets 505 (see FIG. 5B).

A cable 503 is shown extending from cable output port 506 (see FIG. 5B) of battery pack holder 501. Cable 503 is threaded through the front tire spokes of bicycle 500 and connected to cable input port 507 (see FIG. 5B) of battery pack holder 501.

Figure 5B:
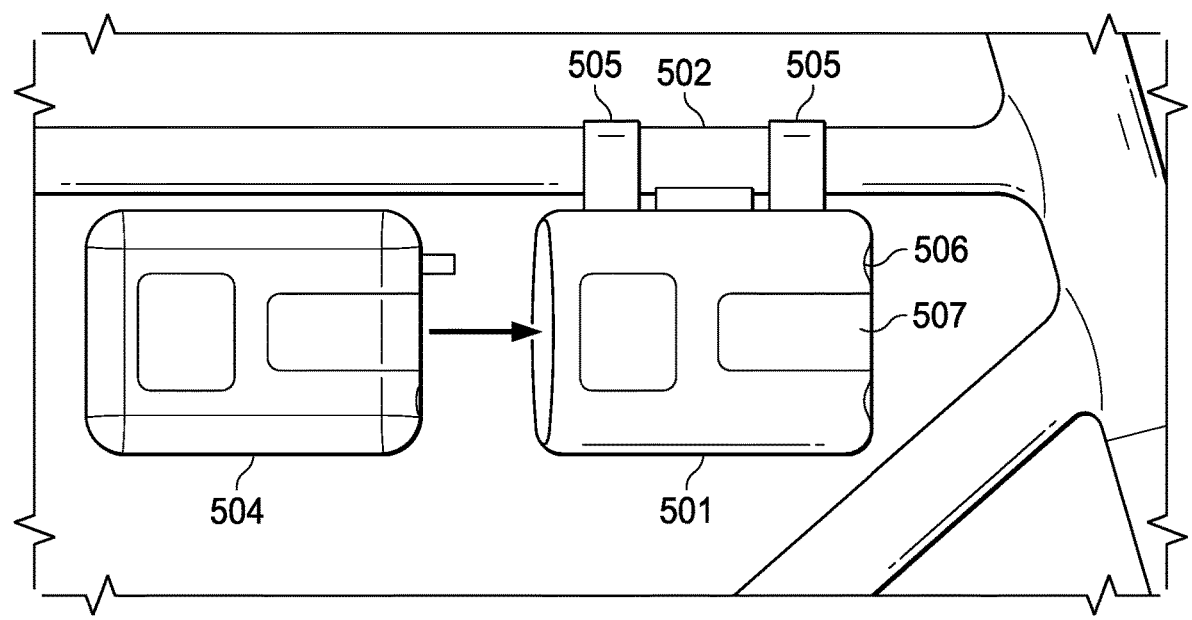
FIG. 5B is a side view of the bicycle accessory shown in FIG. 5A, according to an embodiment.
Figure 5C:
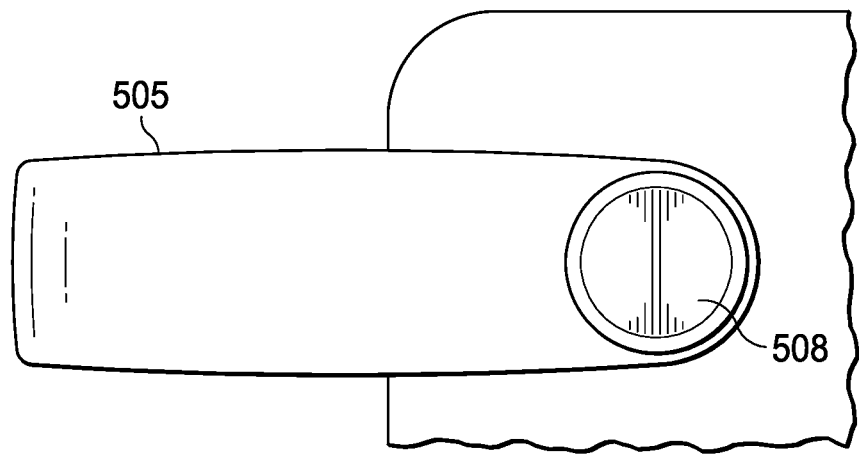
FIG. 5C illustrates a bracket with magnetic clasp for mounting the bicycle accessory to a bicycle frame, according to an embodiment.
Figure 5D:
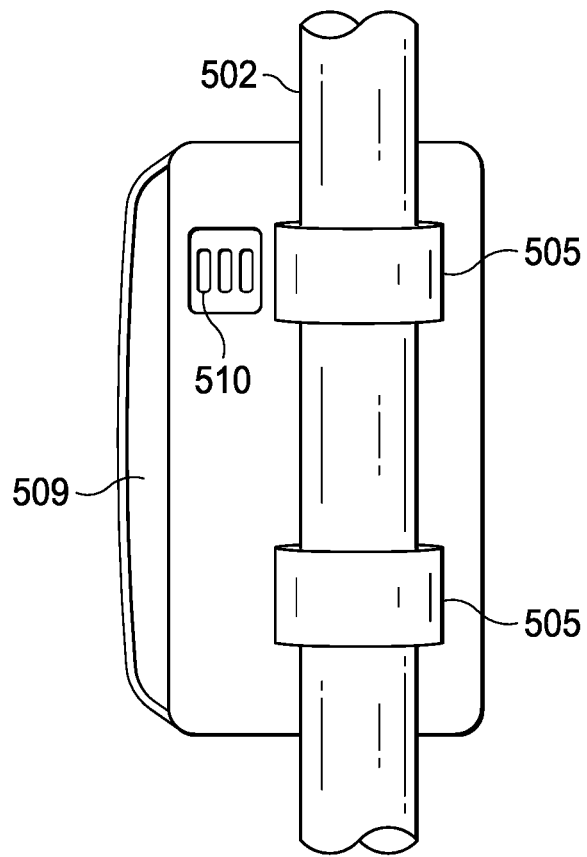
FIG. 5D is a top plan view of the bicycle accessory shown in FIG. 5A including an exterior pocket with fastener and port openings for a USB charging cable and security cable, according to an embodiment.
Figure 5E:
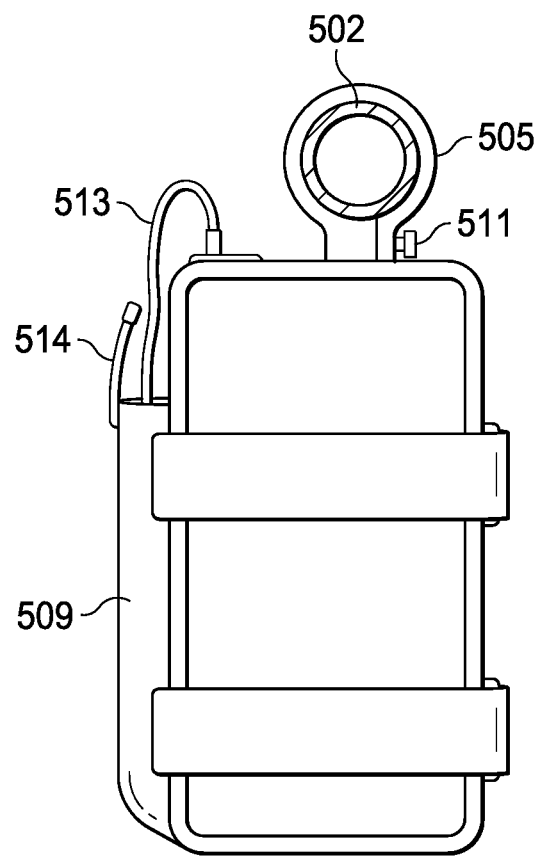
FIG. 5E is a rear view of the bicycle accessory shown in FIG. 5A, according to an embodiment.

FIG. 5B is a side view of the battery pack holder 501 shown in FIG. 5A, according to an embodiment. Portable battery pack device 504 slides into battery pack holder 501 and clicks into place with flexible plastic clips/fasteners or other attachment mechanism. FIG. 5C is a top plan view of bracket 505 shown in FIG. 5A with a magnetic fastener 508, according to an embodiment. FIG. 5D is a top plan view of battery pack holder 501 showing exterior pocket 509 for holding personal belongings with cut-out 510 for access to USB-C ports for charging. FIG. 5E is a rear view of battery pack holder 501 further illustrating exterior pocket 509 with fastener 510, and screw head mechanism 511 for attaching brackets 505 to bike frame 502. Also shown is charging cable 513 coupled to the battery pack device 504 through port opening 512 in battery pack holder 501. In an embodiment, fastener 510 is a zipper.

Figure 6A:
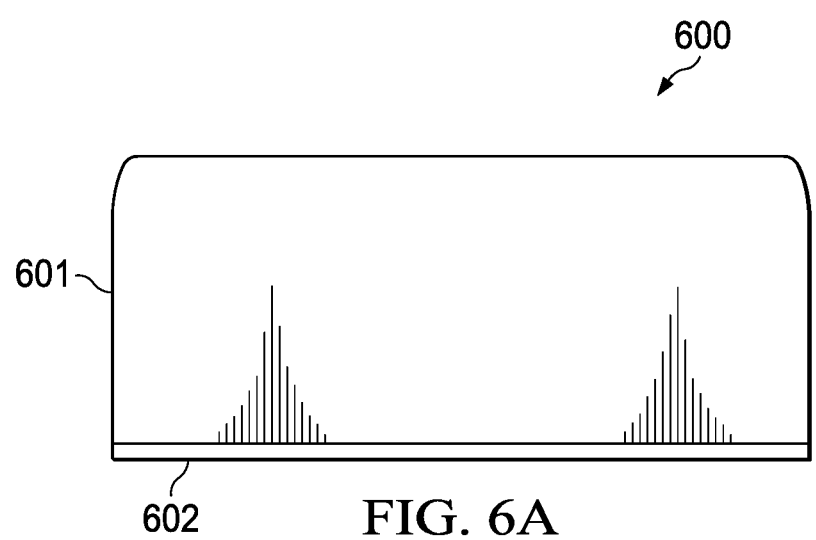
FIG. 6A is a side view of a housing for the portable battery pack device showing friction pad material/coating to prevent slippage, according to an embodiment.

FIG. 6A is a side view of battery pack device housing 600 including friction material 602 (e.g., deformable rubber or plastic) on the bottom perimeter edge to create a tight seal with the contact surface and to prevent slippage of the device, according to an embodiment. Friction material 602 is deformable so as to seal all perimeter edges of housing 600 even if some particles are present between the material and the contact surface. Friction material also inhibits "prying" of the device from the contact surface by a thief. Friction material 602 also provides additional protection in the event the device is dropped.

Figure 6B:
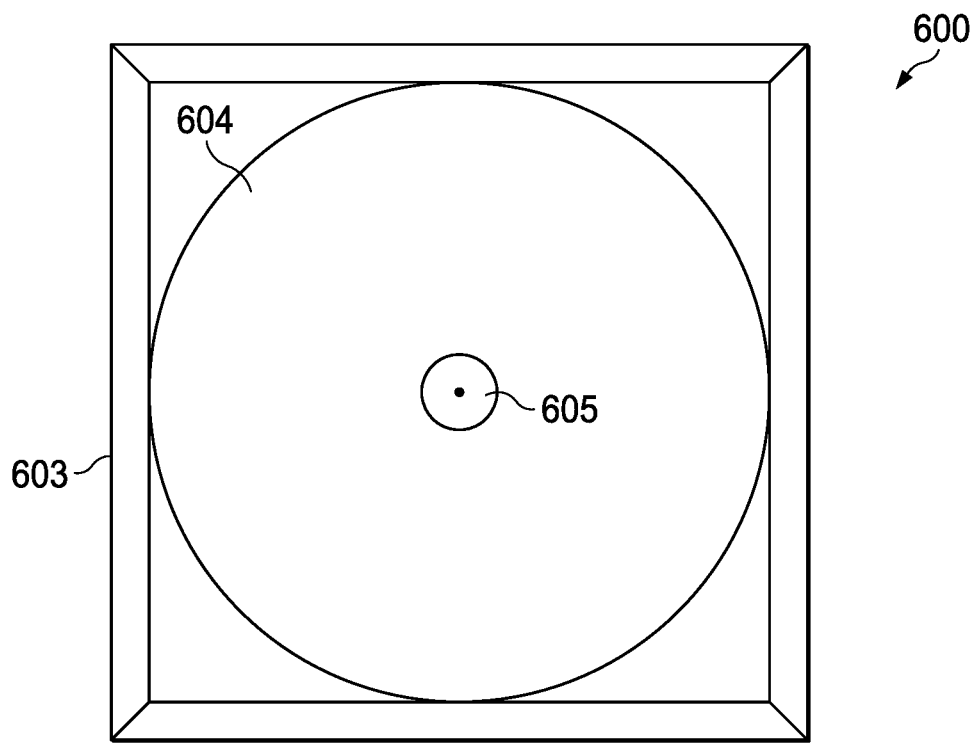
FIGS. 6B and 6C are top plan views of the anchor base assembly, according to an embodiment.

FIG. 6B is a top plan view of the anchor base assembly shown in FIG. 300, according to an embodiment. The view shows circular suction cup 604, metal attachment plate 605 for attaching to rod 305. Also shown is housing edge 603 with friction material to prevent slippage. Circular suction cup 604 can be any suitable size and material (e.g., 3 inch diameter rubber suction cup).

Figure 6C:
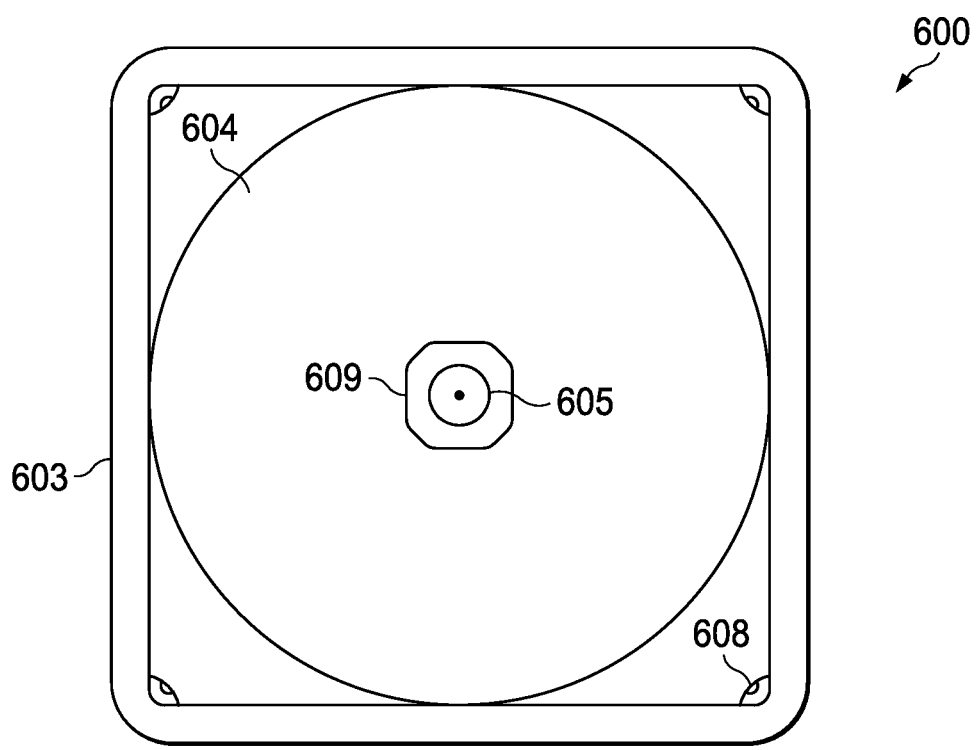

FIG. 6C is a top plan view of the underside of the anchor base assembly shown in FIG. 3, showing suction cup 604, rod 605, perimeter edge 603 with friction material to prevent slippage and also compress to maintain a tight seal with the contact surface when in locked/sealed state. Also shown is groove 608 for removable housing to click/latch into anchor base assembly, according to an embodiment.

Figure 7:
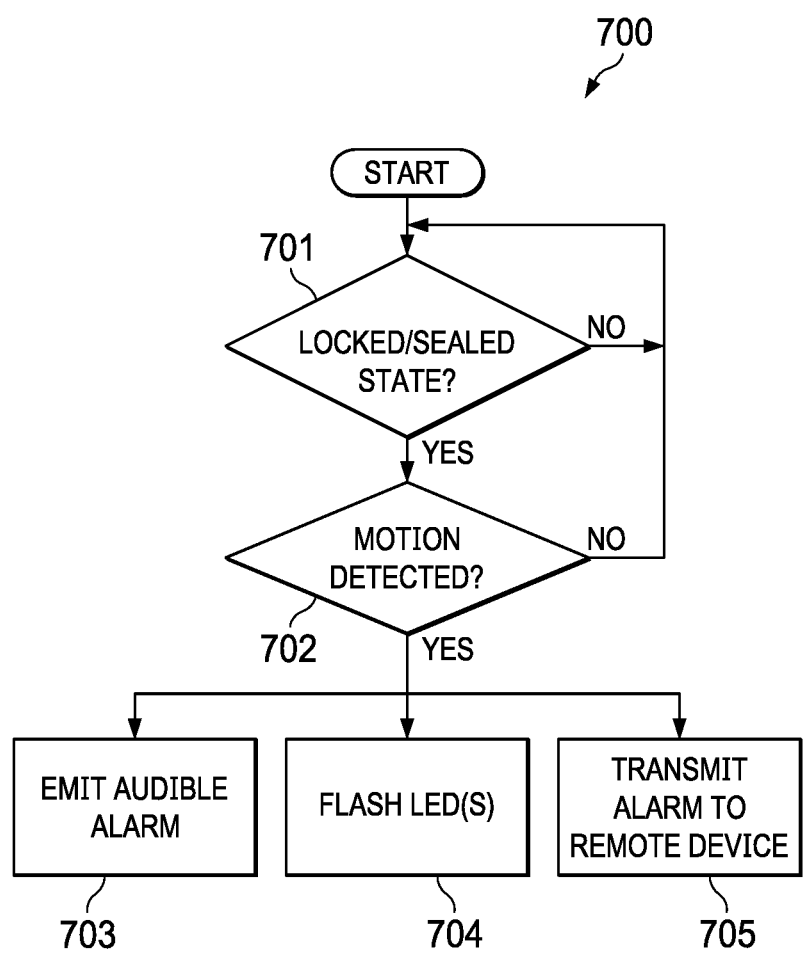
FIG. 7 is a flow diagram of a process of triggering an audible and visible alarm and wireless transmission, when the portable battery pack device is moved while in an "armed" state, according to an embodiment.

FIG. 7 is a flow diagram of a process 700 of triggering an audible and visible alarm and wireless transmission, when the battery pack device is moved while in the "armed" state, according to an embodiment.

Process 700 begins by determining whether the battery pack device is in a locked/sealed state (701). In accordance with being in a locked/sealed state, determining whether motion is detected (702). In accordance with detection motion, emitting an audible alarm (703), flashing one or more LEDs (704) and transmitting an alarm message/data to one or more remote devices (705).

Figure 8:
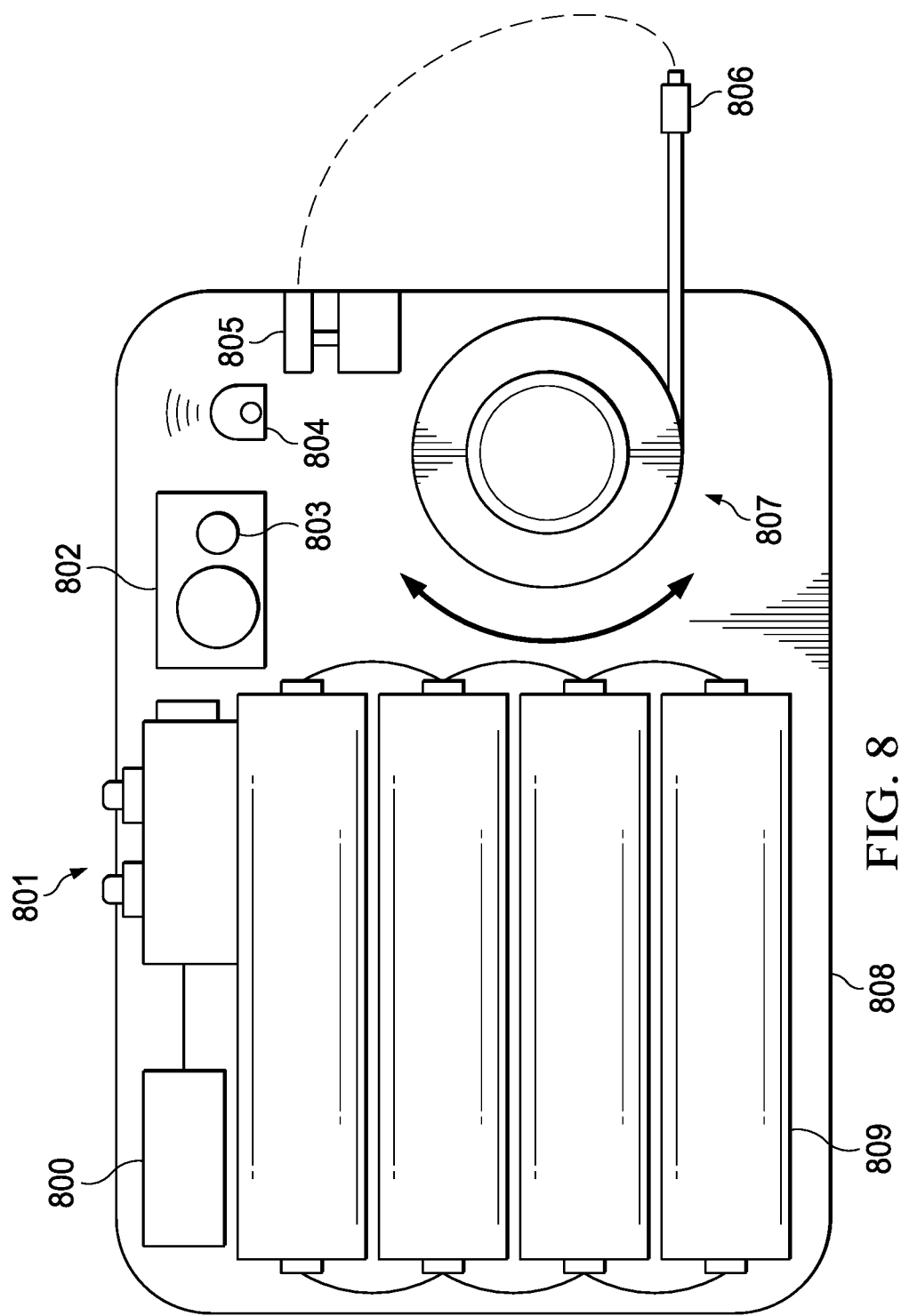
FIG. 8 is a top plan view of a portable battery pack device, according to an embodiment.

FIG. 8 is a top plan view of a portable battery pack device 800, according to an embodiment. Portable battery pack device 800 includes controller 801, I/O charging ports 802, optional speaker 803, optional indicator light 804, optional motion sensor 805, cable lock receptacle 806, cable pin 807, spooled retractable cable 808, and battery array 809 (e.g., Li-ion cells).

In an embodiment, motion sensor 805 (e.g., vibration sensor 403c) is activated when portable battery pack device 800 is moved. If motion sensor 805 is activated, controller 801 causes an alarm module (e.g., alarm module 403d) to emit an audible sound (e.g., a siren) through the speaker 803 and indicator light 804 flashes red to indicate portable battery pack device 800 has been potentially tampered with. Battery array 809 includes a plurality of battery cells that are charged or discharge through I/O charging ports 802. Charging and discharging circuitry is also included but not shown in FIG. 8, such as a voltage or current regulator, battery protector that includes back-to-back FET switches, to protect the battery pack against fault conditions (e.g., overvoltage, undervoltage and overcurrent), a temperature sensor that will open due to prolonged overcurrent or overtemperature conditions, and "gas-gauge" circuitry that measures charge and discharge current, and another circuitry typically used in battery packs.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further including," in the foregoing description or following claims, what follows this phrase can be an additional step or entity, or a sub-step/sub-entity of a previously-recited step or entity.

What is claimed is:

1. An apparatus comprising:
  a housing having a top surface and at least one side surface, the housing having two or more ports, the two or more ports including at least one charging port configured to charge an accessory device attached to the at least one charging port and a input port for receiving a pin;
  one or more batteries;
  one or more printed circuit boards containing electronic components, wherein the electronic components include charging circuitry coupled to the charging port and the one or more batteries;
  an anchor base assembly, including:
    an actuator;
    mechanical linkage coupled to the actuator; and
    a lock configured to lock or unlock the actuator.

2. The apparatus of claim 1, wherein the electronic components further include: a processor, a motion sensor coupled to the processor; an alarm module coupled to the processor; a loudspeaker coupled to the alarm module; and memory storing instructions for execution by the processor.

3. The apparatus of claim 1, further comprising:
  a suction cup coupled to the mechanical linkage.

4. The apparatus of claim 1, further comprising:
  a cable output port in the housing;
  a security cable assembly, the security cable assembly comprising:
    a cable;
    a cable spool including a torsional spring which provides a force to retract the cable into the cable output port; and
    a ratcheting mechanism configured to allow the cable spool on which the cable is wrapped to lock in different rotational configurations.

5. The apparatus of claim 4, wherein the cable includes one or more wires coupled to the one or more batteries and a circuit configured to detect an open or short circuit if the one or more wires are cut and to inform the processor of the open or short circuit.

6. The apparatus of claim 1, wherein the one or more batteries are rechargeable and the one or more printed circuit boards further comprise battery recharging circuitry.

7. The apparatus of claim 1, wherein the actuator is a lever.

8. The apparatus of claim 7, wherein the mechanical linkage includes a rod attached to a pin of the lever and a compression spring configured to provide a restoring force to move the lever into an unlocked position.

9. The apparatus of claim 1, wherein the lock is an electronic lock including buttons for entering a code.

10. The apparatus of claim 1, wherein the lock is a mechanical key lock.

11. The apparatus of claim 1, wherein the lock is a fingerprint sensor.

12. The apparatus of claim 1, wherein one or more printed circuit boards include one or more wireless transceiver modules configured to allow wireless communications with remote devices.

13. The apparatus of claim 1, further comprising:
 a light emitting diode (LED) indicator module coupled to the processor and configured to flash when an alarm is triggered by the alarm module.

14. The apparatus of claim 1, wherein one or more printed circuit boards includes a global navigation satellite system (GNSS) receiver coupled to the processor.

15. A method comprising:
 receiving, using one or more processors of a portable battery pack device, a signal that a security anchor base of the portable battery pack device is attached to a contact surface and locked;
 responsive to the signal, placing the portable battery pack into an alarmed state;
 determining, using or more motion sensors of the portable battery pack device, that the portable battery pack is in motion; and
 responsive to determining that the portable battery pack device is in motion, triggering an audible alarm that is played through a loudspeaker of the portable battery pack device.

16. The method of claim 15, further comprising:
 responsive to the signal, flashing one or more light emitting diodes of the portable batter pack device.

17. The method of claim 15, further comprising:
 responsive to the signal, transmitting alarm data to a remote device over a wireless communication link.

* * * * *